United States Patent [19]

Takemoto

[11] 4,024,708

[45] May 24, 1977

[54] MULTI CYLINDER INTERNAL COMBUSTION ENGINE

[75] Inventor: Takashi Takemoto, Nagaokakyo, Japan

[73] Assignee: Mitsubishi Jidosha Kogyo Kabushiki Kaisha, Tokyo, Japan

[22] Filed: Dec. 4, 1975

[21] Appl. No.: 637,795

[30] Foreign Application Priority Data

Dec. 4, 1974  Japan .............................. 49-147239

[52] U.S. Cl. ................................. 60/278; 60/282; 123/119 A
[51] Int. Cl.² .................. F02B 75/10; F02M 25/06
[58] Field of Search .......... 60/278, 282; 123/119 A

[56] References Cited

UNITED STATES PATENTS

| 3,200,800 | 8/1965 | Du Bois | 123/59 A |
| 3,809,039 | 5/1974 | Alquist | 123/119 A |
| 3,827,237 | 8/1974 | Linder | 123/119 R |
| 3,885,538 | 5/1975 | Suter | 123/119 A |
| 3,941,105 | 3/1976 | Yagi | 123/119 A |

Primary Examiner—Douglas Hart
Attorney, Agent, or Firm—Sughrue, Rothwell, Mion, Zinn & Macpeak

[57] ABSTRACT

A multi cylinder internal combustion engine is disclosed having the cylinders arranged in A and B groups. The A cylinders are supplied with an enriched air-fuel mixture, and the B cylinders are supplied with a lean air-fuel mixture. An apparatus for purifying the exhaust gas gathers exhaust gas from the cylinders A and cylinders B and subjects the same to oxidation reaction. Also, the exhaust gas is recycled into the intake system for the cylinders A.

4 Claims, 3 Drawing Figures

MULTI CYLINDER INTERNAL COMBUSTION ENGINE

RELATED APPLICATIONS

This application is related to U.S. Application Ser. No. 637,794, entitled "Ignition Apparatus" and filed on the same data herewith.

BACKGROUND OF THE INVENTION

1. Field of the Invention

This invention relates to a multi cylinder internal combustion engine having apparatus for purifying exhaust gases, and in particular to such engines for use in automobiles.

2. Description of the Prior Art

The large number of vehicles with internal combustion engines has caused air pollution problems due to the vehicle exhaust, and as a result various types of exhaust purification means have been proposed. They are, however, defective in view of durability, costs, size of the apparatus, purification power and the like.

In vehicle internal combustion engines, each of the cylinders is generally designed so that the air-fuel ratio to be supplied is kept as uniform as possible. However, during a partial load condition the concentration of NOx in the exhaust gas is high at the air-fuel ratio at which the fuel consumption can be reduced to minimum. During a heavy load condition where the throttle is opened near to its extreme opening position, the concentration of CO and HC left as unburnt gases in the exhaust is high since the enriched air-fuel mixture in the cylinders undergoes incomplete combustion. The often results from low temperature at the inner wall of the cylinders or the like.

As is well-known, while the concentrations of CO and HC in the exhaust gas can be reduced through effective combustion at a high temperature by supplying sufficient amounts of air, the NOx concentration is increased as the combustion temperature goes higher. The combustion temperature should, therefore, be lowered in order to reduce the NOx concentration.

Thus, the following three factors are present in typical internal combustion engines:

1. NOx concentration is reduced both at lower air-fuel ratio and at higher air-fuel ratio as compared to that ratio resulting in excellent combustion;
2. CO and HC concentrations are increased at lower air-fuel ratio; and
3. CO and HC concentrations are reduced and oxygen concentration is increased at higher air-fuel ratio provided that there are no misfirings. (These three normal factors can be seen in FIG. 3)

SUMMARY OF THE INVENTION

According to this invention the discharge of HC and CO as well as NOx from a multi cylinder internal combustion engine is reduced. The lack of oxygen in the exhaust gas is completely compensated for without or with no substantial secondary air charge. The HC and CO left as unburnt gases in the exhaust gas are subjected to complete combustion or oxidation reaction with oxygen present in intake air-fuel mixture. The multi cylinder internal combustion engine according to this invention comprises means for supplying enriched air-fuel mixture, means for supplying lean air-fuel mixture, a plurality of cylinders grouped into cylinders A to be supplied with enriched air-fuel mixture and cylinders B to be supplied with lean air-fuel mixture from both of the above supplying means, an apparatus for purifying exhaust gas which gathers exhaust gas from the cylinders A and cylinders B and subjects the same to oxidation reaction, and an apparatus for recycling exhaust gas which introduces the exhaust gas into an intake system for the cylinders A.

BRIEF DESCRIPTION OF THE ACCOMPANYING DRAWINGS

This invention is to be desired in detail by way of its preferred embodiment referring to the accompanying drawings, wherein FIG. 1 is a vertical section of an embodiment of this invention;

FIG. 2 is another vertical section of the above embodiment taken along lines II-II of FIG. 1; and FIG. 3 is a graphic representation of the relationship of the concentrations of noxious gases and oxygen contained in the exhaust gas to the air-fuel ratios.

DETAILED DESCRIPTION OF THE PREFERRED EMBODIMENT

Figure 1:
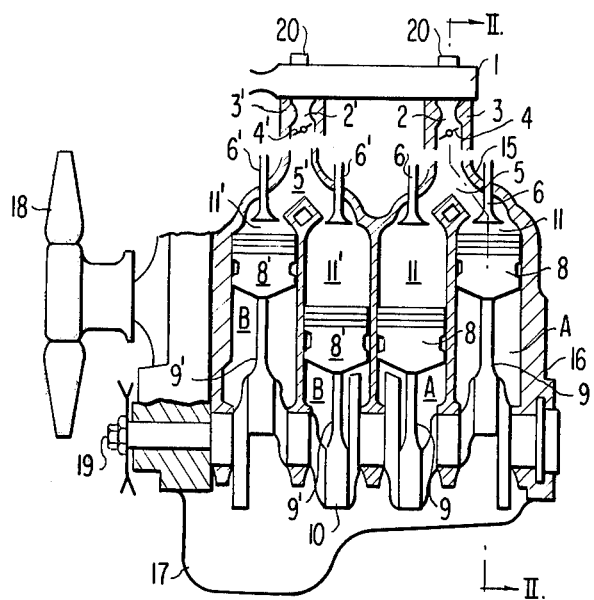
Figure 2:
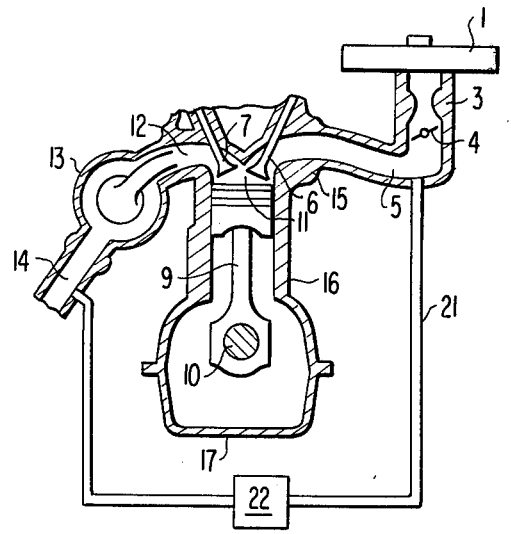

In FIG. 1 and FIG. 2 there is illustrated a preferred embodiment of this invention as applied to a four cylinder gasoline engine. Two cylinders, referred to as cylinders, referred to as cylinders B, receive a lean air-fuel mixture. Cylinders A and B are arranged as shown in FIG. 1 so that the ignition of cylinders A alternates with the ignition of cylinders B. Reference numeral 1 denotes an air cleaner used for the cylinders A and B and reference numeral 2 denotes an apparatus for supplying enriched air-fuel mixture and consists, for example, of a caburetor, fuel injection pump or the like. In the embodiment shown, a carburetor is employed. Reference numeral 2' denotes an apparatus for supplying lean air-fuel mixture having the same construction as the latter mentioned apparatus for supplying enriched air-fuel mixture. There are also shown venturies 3 and 3', throttle valves 4 and 4', and intake manifolds 5 and 5' for distributing the airfuel mixtures from the air-fuel supplying apparatus 2 and 2' into the cylinders A and B respectively. The cylinders A and the cylinders B are substantially identical to each other in construction and therefore the same numerals are used to designate like parts of the A and B cylinders, with the numbers being primed for the B cylinders.

As shown in the drawings the apparatus includes, intake valves 6 and 6', exhaust valve 7, pistons 8 and 8' for each of the cylinders A and B, connecting rods 9 and 9' for said pistons, crank shaft 10 connected to said connecting rods, combustion chambers 11 and 11', exhaust manifold 12, exhaust gas purifying apparatus 13, exhaust pipe 14 connected to said exhaust purifying apparatus 13, cylinder head 15, crank case 16, oil pan 17 and a fan 18 for cooling engine cooling water. The apparatus 13 is constructed as a thermal reactor in this embodiment, is provided in exhaust system, and is used for purifying the exhaust gas by means of catalysts or by way of re-combustion.

Reference numeral 20 represents retaining nuts for the above described air cleaner 1 and reference numeral 19 is a nut for mounting the above described crank shaft 10 to the crank case 16.

An exhaust gas recycling apparatus having a pipe 21, communicating the exhaust pipe 14 with the intake manifold 5 at the side where the enriched air-fuel mixture is supplied, and a flow metering device 22, inserted midway of said pipe 21, is provided. A portion of the exhaust gas in exhaust pipe 14 is diverted through the device 22. The amount diverted depends on the vehicle speed and the load condition of the engine. It will be noted that all exhaust manifolds 12 and 12' are connected to a single exhaust gas purifying apparatus 13, and the exhaust therefrom at 14 is recycled via pipe 21 only to the intake manifolds of the A cylinders.

Figure 3:
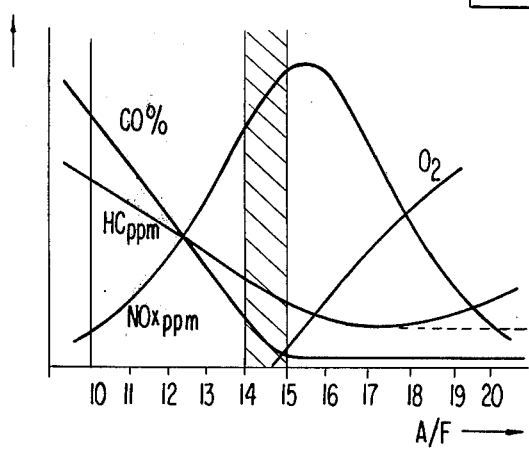

As apparent from FIG. 3, showing the relation between the concentrations of noxious gases and oxygen in the exhaust gas and the air-fuel ratio for typical vehicle engines, the air-fuel ratio should be decreased to 12 to 13 or less or increased to 18 or more in order to reduce the amount of NOx in the exhaust. In the embodiment having the foregoing construction, where the air-fuel ratios are adjusted to about 12-13 in the enriched air-fuel mixture for the cylinders A during the normal running condition under a partial load and to about 18-19 in the lean air-fuel mixture in the cylinders B during normal running condition under a partial load, the total air-fuel ratio of the air-fuel mixture to be supplied to both of the cylinders A and B lies about at 15-16. In both groups of cylinders the ratios are such, as can be seen from FIG. 3, that the amount of NOx produced is low. And while the A cylinders will produce a relatively large amount of exhaust CO and HC, the B cylinders will provide a relatively large amount of $O_2$ in the exhaust. Thus the exhaust $O_2$ will oxidize the exhaust CO and HC in the purifying apparatus 13. This results in oxidation of most of the CO and HC by the oxygen in the intake gas mixture with no secondary air charges into the exhaust gas thereby reducing the exhaustion of the CO and HC released in the atmosphere. However, during acceleration and deceleration of the engine, at a heavy load condition or the like, the intake air-fuel mixture is generally enriched by the rapid laminar inflow of unburnt fuel deposited on the inside of the intake manifolds 5 and 5' to decrease total air-fuel ratio to less than 15. As a result the amount of oxygen is not sufficient, and a larger quantity of HC and CO will be contained in the exhaust gas released into the atmosphere.

For avoiding the foregoing atmospheric release of the HC and CO, it is known to provide a secodary air charge apparatus. However, that requires an air pump, and a secondary air control device, resulting in increased cost and complexity.

As an alternative, the air-fuel ratio in the air-fuel mixture supplied to the cylinders A or B may be slightly increased from the above specified levels. This also causes problems. If the air-fuel ratio of the lean air-fuel mixture supplied to cylinders B is further increased, misfires would frequently result, thereby reducing the power of the engine or even stopping it. The increase of the air-fuel ratio in the enriched air-fuel mixture supplied to the cylinders A would defectively increase the exhaustion of NOx as is apparent from FIG. 3.

In the present invention, the pipe 21 and the flow control device 22 of simple structure are provided. Therefore, if the air-fuel ratio in the enriched air-fuel mixture to be supplied to the cylinders A is somewhat increased from the specified level of 12-13 toward the ideal air-fuel ratio, the combustion temperature will not be increased so high as to produce a great amount of NOx, due to the inflow of the exhaust gas. The reason for this is that since the combustion chamber has a limited volume, and since some exhaust gas is introduced, the total volume of fuel and air ($O_2$) is reduced. As a consequence the combustion chamber is not as hot. The amount of exhaust pumped into the intake of cylinders A may be constant and the pump may be continuously operated. In addition since the air-fuel ratio in the enriched air-fuel mixture for the cylinders A is now increased somewhat from said level of 12-13, the total air-fuel ratio of the intake air-fuel mixture for the cylinders A and B will not fall below 15 and thus residual oxygen will be contained in the intake air-fuel mixture in a sufficient amount to completely oxidize the HC and CO in the exhaust gas purifying apparatus 13. This eliminates the use of the additional secondary air charge in the exhaust gas purifying apparatus 13.

Moreoover, if the amount of oxygen contained in the exhaust gas is somewhat insufficient, only a smaller capacity and thus a less expensive air pump is required to be installed.

As is apparent from the foregoing, this invention can reduce the exhaustion of noxious gases, NOx, CO and HC by the use of an apparatus with simplified structure and being inexpensive without requiring air pumps of complicated structure and with large capacity.

What is claimed is:

1. A multi cylinder internal combustion engine comprising:

first and second groups of cylinders, intake manifolds for respective groups of cylinders, means for supplying a relatively enriched air-fuel mixture to said first group of cylinders, means for supplying a relatively lean air-fuel mixture to said second group of cylinders, means for purifying exhaust gas by oxidation thereof, said latter means being positioned to gather exhaust gas from all said cylinders and to subject the same to oxidation reaction, and means for diverting exhaust gas from said purifying means to the intake manifold of said first group of cylinders only.

2. A multi-cylinder engine as claimed in claim 1 wherein said diverting means comprises a pipe connected between the exhaust of said purifying apparatus and the intake manifold of said first group of cylinders.

3. A multi-cylinder engine as claimed in claim 1 wherein said engine includes four cylinders, two in each said group.

4. A multi-cylinder engine as claimed in claim 1, where said purifying means is a thermal reactor and an air pump is provided for supplying air to said thermal reactor when the total air-fuel ratio for the cylinders approaches the ideal ratio.

* * * * *